US011868951B2

(12) United States Patent
Fu et al.

(10) Patent No.: US 11,868,951 B2
(45) Date of Patent: Jan. 9, 2024

(54) CLUSTERING REGULATED VRPTW SOLVER FOR LARGE SCALE BATCH OPTIMIZATION OF LAST MILE DELIVERY

(71) Applicant: Walmart Apollo, LLC, Bentonville, AR (US)

(72) Inventors: Mingang Fu, Palo Alto, CA (US); Amritayan Nayak, Fremont, CA (US); Akshara Dendi, Sunnyvale, CA (US); Li Ji, Fremont, CA (US)

(73) Assignee: Walmart Apollo, LLC, Bentonville, AR (US)

(*) Notice: Subject to any disclaimer, the term of this patent is extended or adjusted under 35 U.S.C. 154(b) by 161 days.

(21) Appl. No.: 16/592,182

(22) Filed: Oct. 3, 2019

(65) Prior Publication Data
US 2021/0103891 A1   Apr. 8, 2021

(51) Int. Cl.
*G06Q 10/0835* (2023.01)
*G01C 21/34* (2006.01)
*G06F 18/231* (2023.01)

(52) U.S. Cl.
CPC ..... *G06Q 10/08355* (2013.01); *G01C 21/343* (2013.01); *G06F 18/231* (2023.01)

(58) Field of Classification Search
CPC ........... G06Q 10/047; G06Q 10/08355; G06F 18/231; G01C 21/343
See application file for complete search history.

(56) References Cited

U.S. PATENT DOCUMENTS

| 9,569,745 | B1* | 2/2017 | Ananthanarayanan ................ G01C 21/343 |
| 10,332,064 | B1* | 6/2019 | Davidson ......... G06Q 10/08355 |
| 10,346,766 | B1* | 7/2019 | Yao ..................... G06Q 10/083 |
| 2008/0275643 | A1* | 11/2008 | Yaqub ................. G01C 21/343 701/412 |
| 2013/0151435 | A1* | 6/2013 | Hocquette ........ G06Q 10/08355 705/338 |
| 2017/0336219 | A1* | 11/2017 | Di Lorenzo ....... G01C 21/3446 |
| 2018/0328745 | A1* | 11/2018 | Nagy .................... G05D 1/0274 |
| 2020/0117683 | A1* | 4/2020 | Ji .......................... G06F 16/285 |
| 2021/0081894 | A1* | 3/2021 | Alesiani ............. G06F 11/0709 |

OTHER PUBLICATIONS

Huneycutt, Jake, An Introduction to Clustering Algorithms in Python, May 29, 2018, towards data science, https://towardsdatascience.com/an-introduction-to-clustering-algorithms-in-python-123438574097 (Year: 2018).*

* cited by examiner

*Primary Examiner* — Rupangini Singh
(74) *Attorney, Agent, or Firm* — Morgan, Lewis & Bockius LLP; Manita Rawat

(57) ABSTRACT

A system for generating a geographically-clustered routing solution includes a computer system configured to receive a plurality of orders. Each order in the plurality of orders comprises a geographic location. The plurality of orders are clustered into a plurality of clusters based on the geographic location of each order and a routing solution is generated for each of the plurality of clusters. Each routing solution is transmitted to at least one vehicle system.

14 Claims, 6 Drawing Sheets

CLUSTERING REGULATED VRPTW SOLVER FOR LARGE SCALE BATCH OPTIMIZATION OF LAST MILE DELIVERY

TECHNICAL FIELD

This application relates generally to clustering of large scale batch data and, more particularly, to clustering of large scale delivery batch data in a geographic area.

BACKGROUND

The vehicle routing problem is an optimization problem that attempts to determine the optimal set of routes for a fleet of vehicles to traverse in order to deliver to a given set of customers. Some deliveries in the set may include specific restraints, such as requiring a delivery within a predetermined time window. Current algorithms for determining optimal routes are time and resource intensive.

SUMMARY

In various embodiments, a system for generating a routing solution is disclosed. The system includes a computing device configured to receive a plurality of orders. Each order in the plurality of orders comprises a geographic location. The plurality of orders are clustered into a plurality of clusters based on the geographic location of each order. A routing solution is generated for each of the plurality of clusters and each routing solution is transmitted to at least one vehicle system.

In various embodiments, a non-transitory computer readable medium having instructions stored thereon is disclosed. The instructions, when executed by a processor cause a device to perform operations comprising receiving a plurality of orders. Each order in the plurality of orders comprises a geographic location. The processor further causes the device to cluster the plurality of orders into a plurality of clusters based on the geographic location of each order and generate a routing solution for each of the plurality of clusters. Each routing solution is transmitted to at least one vehicle system.

In various embodiments, a method is disclosed. A plurality of orders is received. Each order in the plurality of orders comprises a geographic location. The plurality of orders is clustered into a plurality of clusters based on the geographic location of each order. A routing solution is generated for each of the plurality of clusters and is transmitted to at least one vehicle system.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
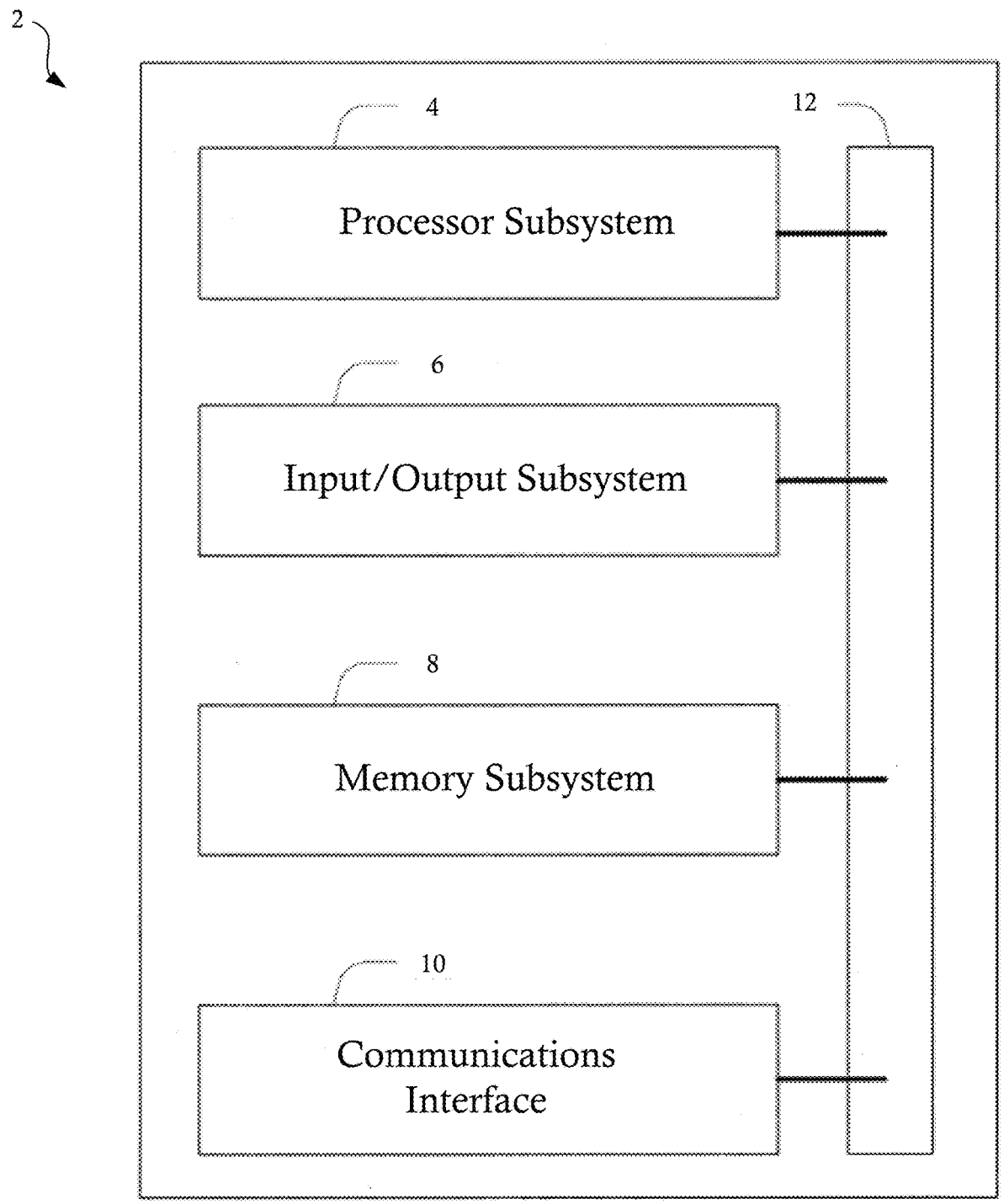
FIG. 1 illustrates a block diagram of a computer system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship. In the claims, means-plus-function clauses, if used, are intended to cover structures described, suggested, or rendered obvious by the written description or drawings for performing the recited function, including not only structure equivalents but also equivalent structures.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming In some embodiments a compiler or interpreter is comprised to convert the instruction set into machine executable code for execution by the processing subsystem 4.

Figure 2:
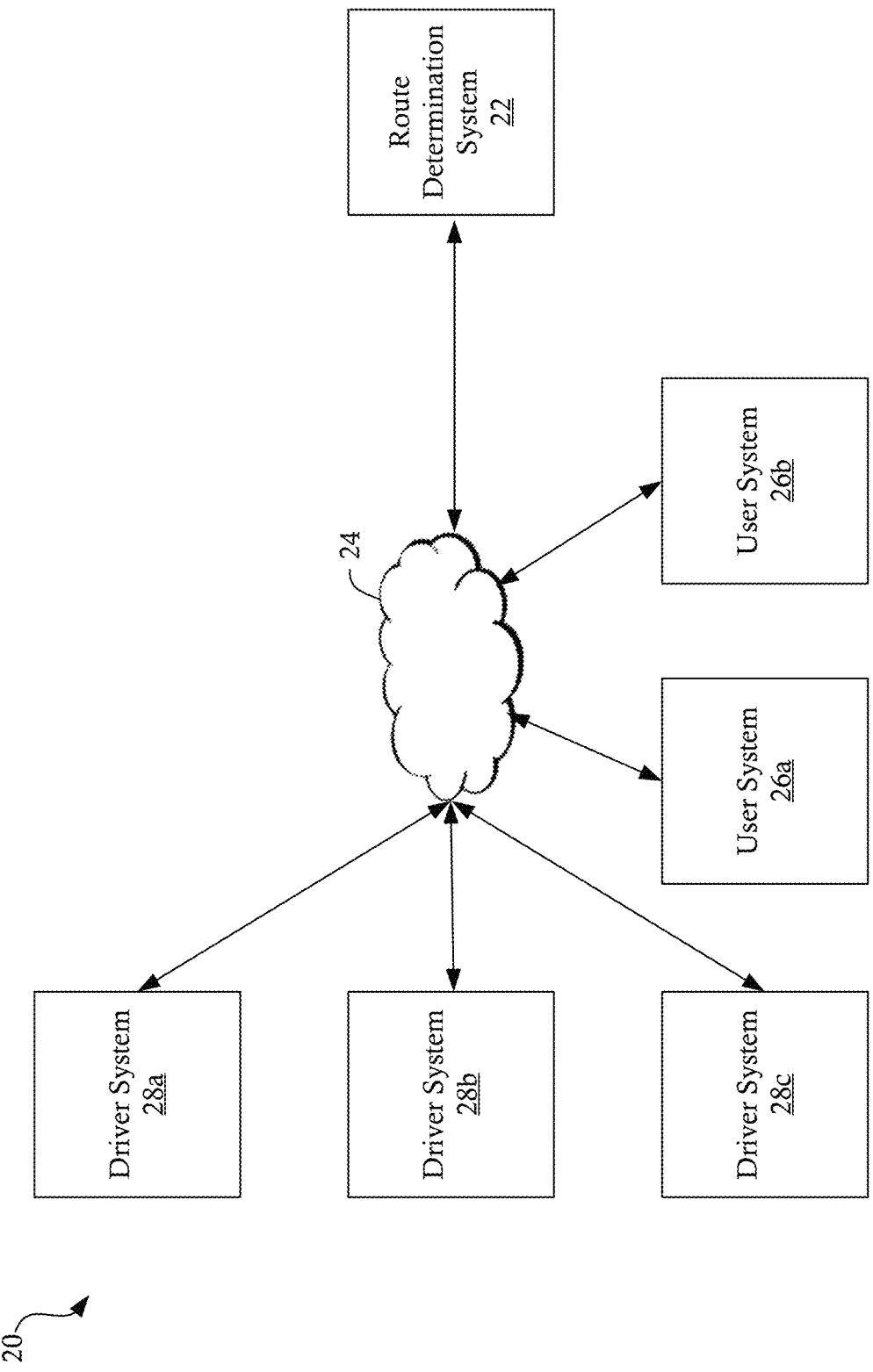
FIG. 2 illustrates a network configured to determine optimal routes using geographically clustered deliveries, in accordance with some embodiments.

FIG. 2 illustrates a network environment 20 configured to determine optimal routes using geographically clustered deliveries, in accordance with some embodiments. The network environment 20 includes a route scheduling system 22, a plurality of user systems 26a, 26b, a plurality of delivery vehicle systems 28a-28c, and/or any other suitable systems. Each of the systems 22, 26a-28c can include a computer system, such as the computer system 2 described above in conjunction with FIG. 1. It will be appreciated that each of the systems 22, 26a-28c can include generic systems and/or special purpose systems, and are within the scope of this disclosure.

Each of the systems 22, 26a-28c are configured to exchange data over one or more networks, such as, for example, network 24. In some embodiments, each user system 26a, 26b is configured to generate an order request including a geographic delivery location and at least one item. The order request may further include a delivery parameter, such as a time window for delivery. The order request is provided from a user system 26a, 26b to the route scheduling system 22 via network 24. The route scheduling system 22 is configure to generate an optimal route for all order requests received at the route scheduling system 22 within a predetermined time period. The route scheduling system 22 applies a geographical-based hierarchical clustering process, as discussed in greater detail below. After generating the optimal routes for the received order requests, the route scheduling system 22 transmits route assignments to each of the delivery vehicle systems 28a-28c. Once the route assignments are provided, the delivery vehicles corresponding to the delivery vehicle systems 28a-28c are loaded and dispatched for delivery.

Figure 3:
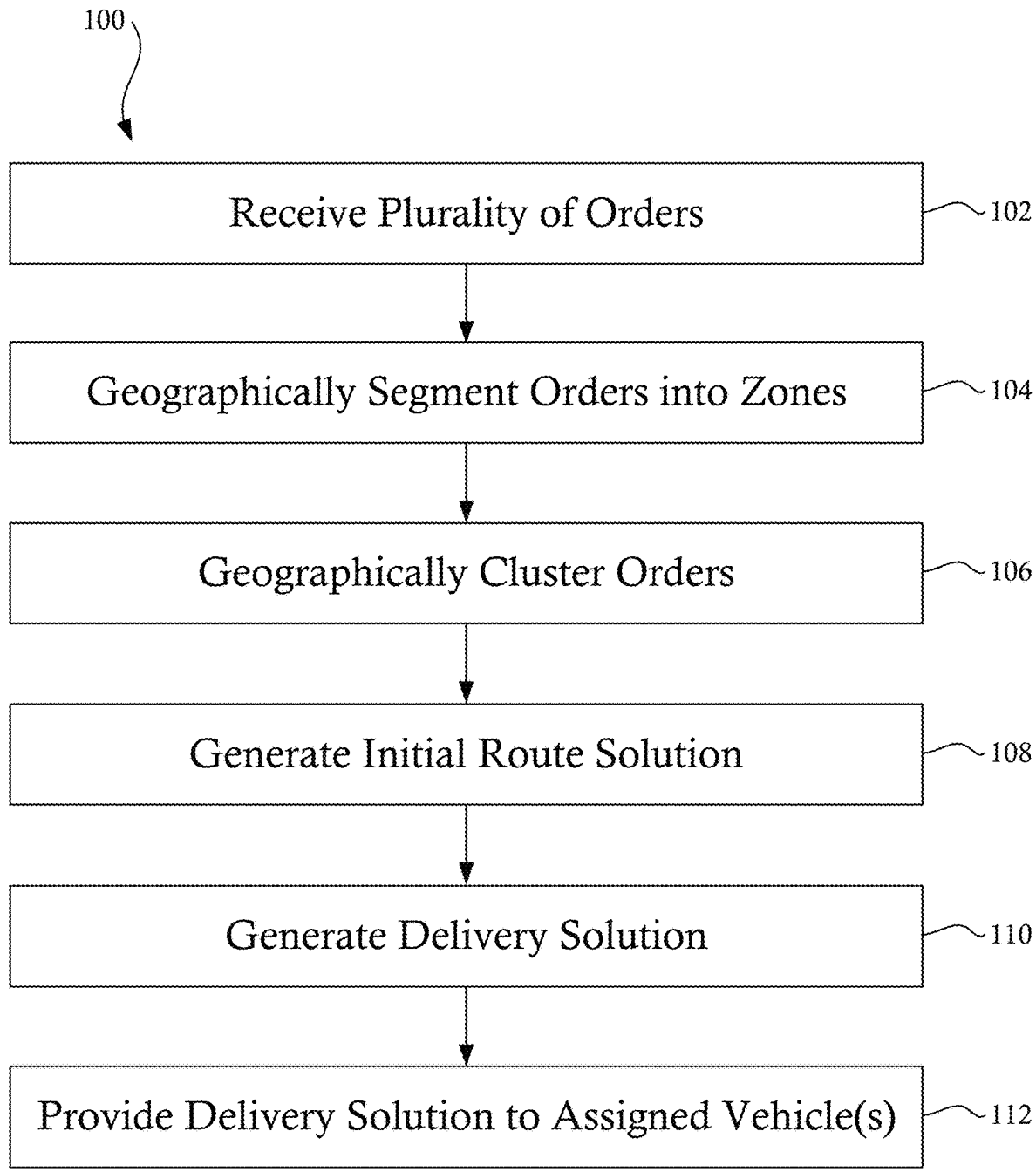
FIG. 3 is a flowchart illustrating a method of generating route assignments using geographic clustering, in accordance with some embodiments.
Figure 4:
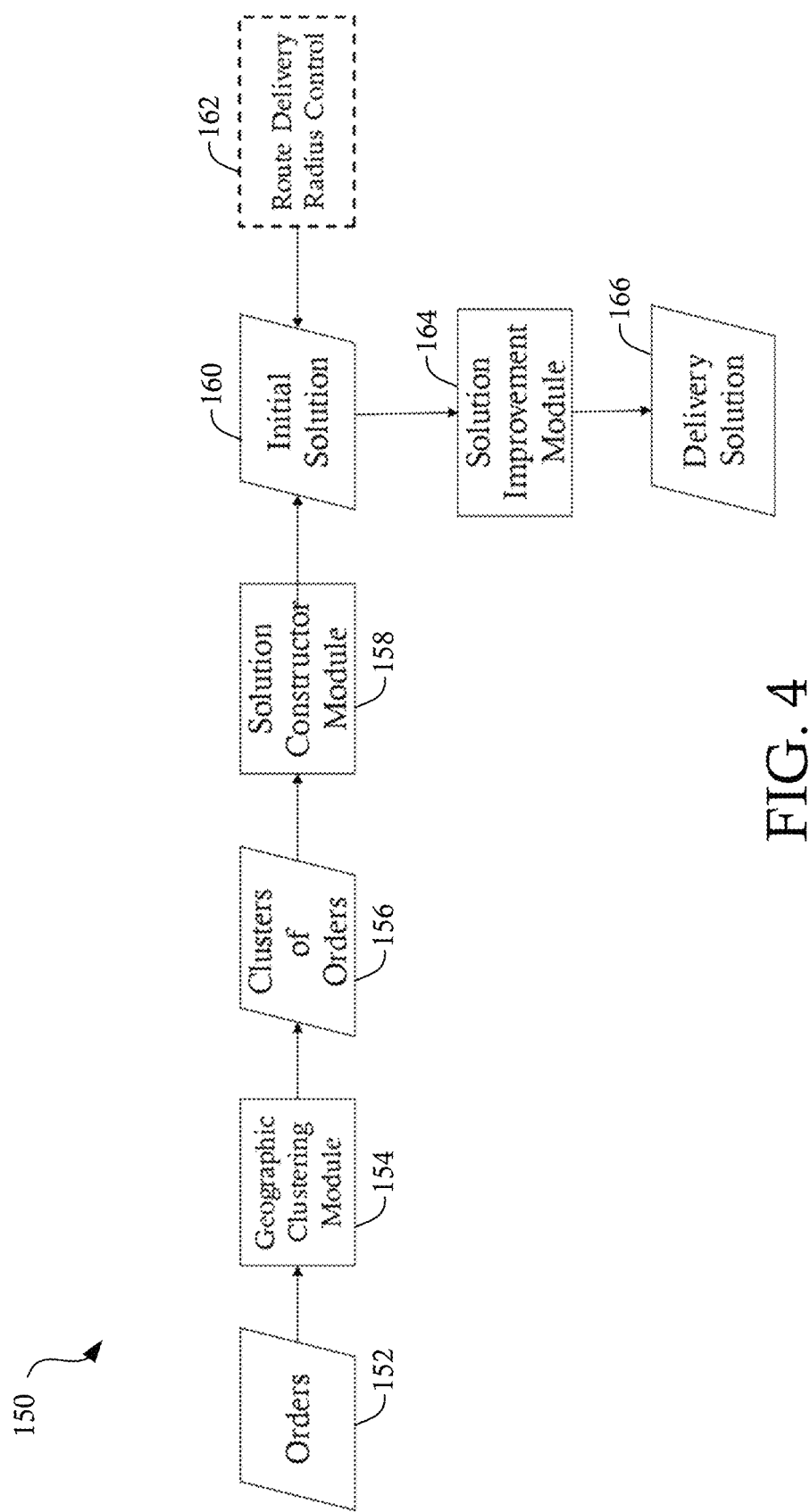
FIG. 4 is a process flow illustrating the method of generating route assignments using geographic clustering of FIG. 3, in accordance with some embodiments.

FIG. 3 is a flowchart illustrating a method 100 of generating route assignments using geographic clustering, in accordance with some embodiments. FIG. 4 is a process flow 150 illustrating the method 100 of generating route assignments using geographic clustering of FIG. 3, in accordance with some embodiments. At step 102, a plurality of orders 152 are received at a route scheduling system 22. The plurality of orders 152 may be received from a plurality of user systems 26a, 26b, as a batch from a front-end e-commerce system, and/or from any other suitable system or systems. Each order in the plurality of orders 152 includes delivery location data and at least one product identifier. Each order may also include one or more order parameters, such as, for example, a time window for delivery.

At step 104, the plurality of orders 152 are geographically segmented. In some embodiments, one or more geographical zones are defined within a larger geographic area. For example, as one embodiment, a first geographic area including New York City may be segmented into a plurality of geographical zones. For example, New York City may be segmented into individual boroughs (e.g., Manhattan, Bronx, Brooklyn, Queens, and Staten Island), segmented based on zip codes, and/or any other suitable segmentation. Segmentation of the plurality of orders 152 creates discrete sets of orders from within the plurality of orders 152

At step 106, each set of orders within the plurality of orders is clustered, for example, by a geographic clustering module 154. Each of the orders in a set of orders includes a delivery address identifying a specific geographic location for delivery. The orders in the set of orders are clustered to generate a set of clusters (or groupings) of orders having similar (or closely located) delivery location data. In some embodiments, one or more machine learning models may be applied to determine an optimal number of clusters for a given plurality of orders 152.

In some embodiments, the plurality of orders 152 are geographically clustered according to GPS or other location data (e.g., delivery addresses, etc.) using a hierarchical clustering process. The geographic clustering model 154 identifies each location for each order as a data point (e.g., as a cluster). The clustering model 154 computes a distance matrix (D) containing the distance from a first data point, i, (e.g., a first location) to each other data point, $j_n$, (e.g., each other order location) in the plurality of orders 152. The geographic clustering module 154 identifies the two clusters (e.g., two locations or data points) having the closest distance and combines the identified clusters into a single cluster. The distance between the new cluster and each remaining cluster is calculated to obtain a reduced distance matrix D until all locations have been agglomerated into a set of X clusters. Clustering (e.g., distance calculations) may be performed using any suitable process, such as for example, a centroid-based process, an average-linkage process, single-linkage process, a complete-linkage process, Ward, and/or any other suitable process.

Figure 5:
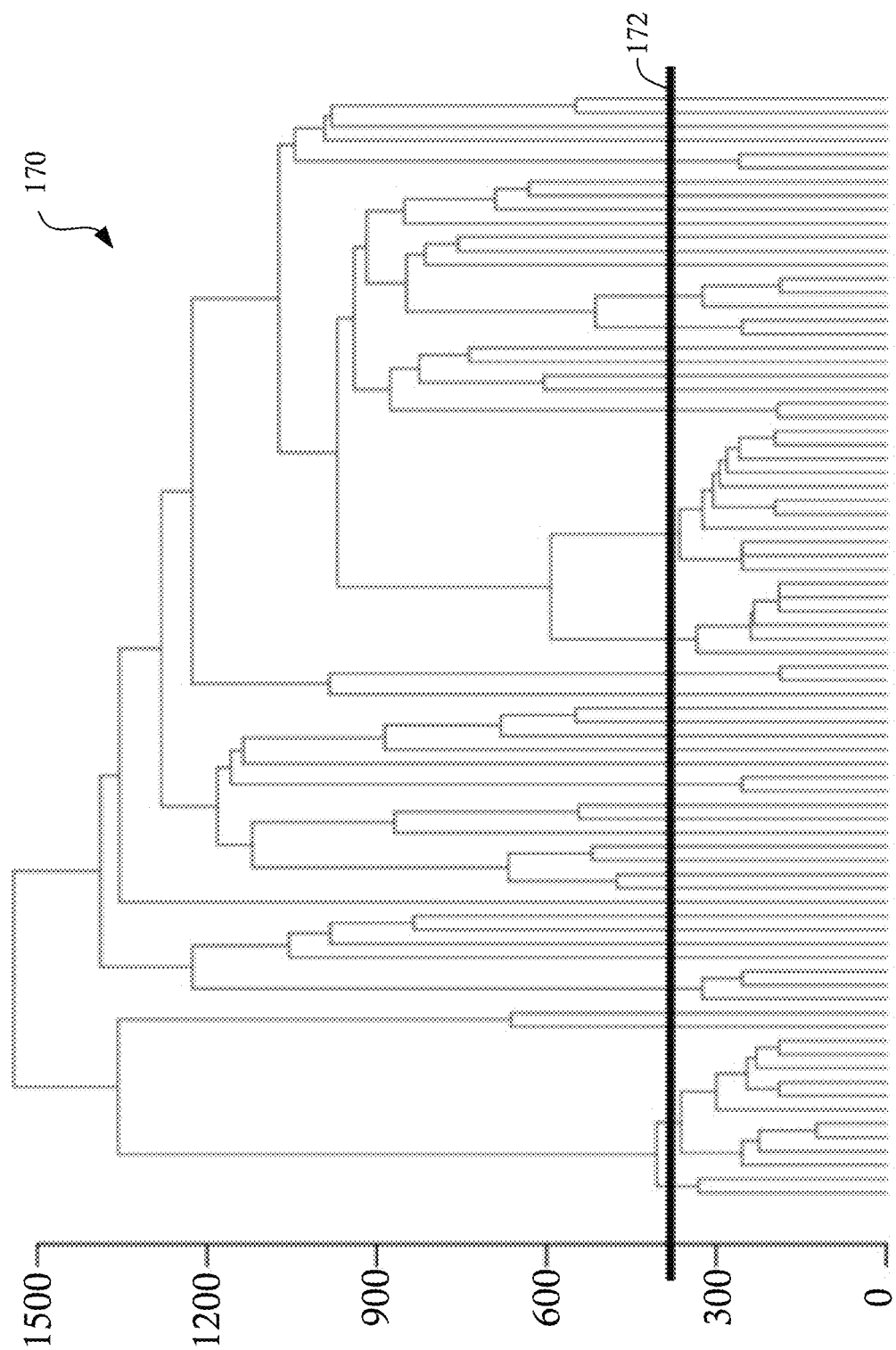
FIG. 5 illustrates a truncated clustering dendrogram including a predetermined number of hierarchical clusters, in accordance with some embodiments.

The hierarchical clustering process generates a hierarchy for all orders contained in the plurality of orders 152. An example hierarchical set, referred to as a dendrogram 170, is illustrated in FIG. 5. As shown in FIG. 5, each of the points, for example, a first point 172, ending along the x-axis correspond to a geographic delivery location for an order. The orders are combined into sets in increasing layers until all sets have been combined into a single set. A cut 174 is made in the dendrogram 170 to select the predetermined number (X) of clusters. The predetermined number of clusters may be determined, for example, using machine learning to determine an optimal number (K) of clusters for a plurality of orders 152.

In some embodiments, the hierarchical clustering module 154 imposes one or more clustering parameters when generating the plurality of geographic clusters 156. For example, the hierarchical clustering module 154 may impose a maximum cluster diameter D, for each of the plurality of geographic clusters 156. The maximum cluster diameter D is the maximum distance that can exist between any two points, i, j in a cluster, e.g.:

$$D=\max\{d_{i,j}\}$$

The hierarchical clustering module 154 may apply a predetermined maximum distance metric and a predetermined number of clusters to generate a set of clusters. The hierarchical clustering module 154 evaluates the cluster performance (e.g., compares equivalent cluster diameter for each cluster in the set of clusters). In some embodiments, the hierarchical clustering module 154 varies the predetermined number of clusters until the equivalent cluster diameter for each cluster is below a target value, e.g., the hierarchical clustering module 154 identifies the optimal number of clusters ($K_{opt}$).

In some embodiments, the hierarchical clustering module 154 may be configured to implement one or more trained clustering models. The trained clustering models may be trained using any suitable machine learning process, such as, for example, an unsupervised machine learning process. A method of training a plurality of clustering networks is disclosed in U.S. patent application Ser. No. 16/114,138, filed on Aug. 27, 2018, and entitled "Systems and Methods to Determine Carrier Based on Tracking Number," the disclosure of which is incorporated herein by reference in its entirety.

At step 108, an initial route solution 160 is generated for each of the geographically clustered set of orders 156. In some embodiments, a solution constructor module 158 receives each of the each of geographically clustered sets of orders 156 and generates a sequenced list of orders for each set 156. The sequenced list may be generated using any suitable method, such as, for example, sequencing based on a distance from a center of the cluster for each geographically clustered set of orders 156. The sequenced list may be stored using any suitable mechanism, such as, for example, a linked list.

In some embodiments, the initial route solutions 160 for each geographically clustered set of orders 156 are generated in parallel, although it will be appreciated that at least some of the initial route solutions 160 may be generated in series. In some embodiments, route parameters 162 may be introduced to restrict and/or shape the initial route solution 160. The route parameters 162 may include any suitable parameters, such as, for example, route delivery radius control, delivery windows, fuel consumption requirements, and/or any other suitable parameters. The route parameters 162 may be the same for each geographically clustered set of orders 156 and/or may vary for one or more geographically clustered set of orders. In some embodiments, the solution constructor module 158 may implement a route solution process, such as, for example, a vehicle flow formulation process, a commodity flow formulation process, a set partitioning problem process, and/or any other suitable process.

At step 110, the initial route solution 160 for each of the geographically clustered set of orders is refined to generate a delivery solution 166. In some embodiments, a solution improvement module 164 is configured to iteratively optimize the initial route solution 160 to optimize one or more parameters. For example, in some embodiments, the solution improvement module 164 is configured to minimize the number of times an edge (e.g., a road between two points) is traversed, minimize the total distance traveled, minimize fuel spent, minimize hours required, and/or any other suitable parameters. The optimization parameters may be fixed, weighted, and/or variable for each geographically clustered set of orders. In some embodiments, the solution improvement module 164 is configured to implement an optimization algorithm, such as, for example, a simulated annealing process, a tabu search process, and/or any other suitable optimization process. It will be appreciated that any suitable method, algorithm, and/or other process may be used to optimize and/or otherwise improve an initial route solution 160.

At step 112, each delivery solution 166 is provided to one or more vehicle systems 28a-28c for loading and execution of the delivery solution 166. For example, in some embodiments, each delivery solution 166 is determined for a single vehicle. The system, such as the route determination system 22, transmits the finalized delivery solution 166 to a vehicle depo and/or a specific vehicle driver system 28a-28c for assignment. When the finalized delivery solution 166 is provided to a vehicle depo, a vehicle depo system (not shown) is configured to select a specific vehicle driver system 28a-28c for assignment. After assigning the delivery solution 166 to a specific vehicle driver system 28a-28c, the corresponding vehicle is loaded with each package corresponding to an order in the geographically clustered set of orders. Once loaded, the vehicle is dispatched and guided on a route corresponding to the delivery solution 166 by the vehicle driver system 28a-28c.

Figure 6A:
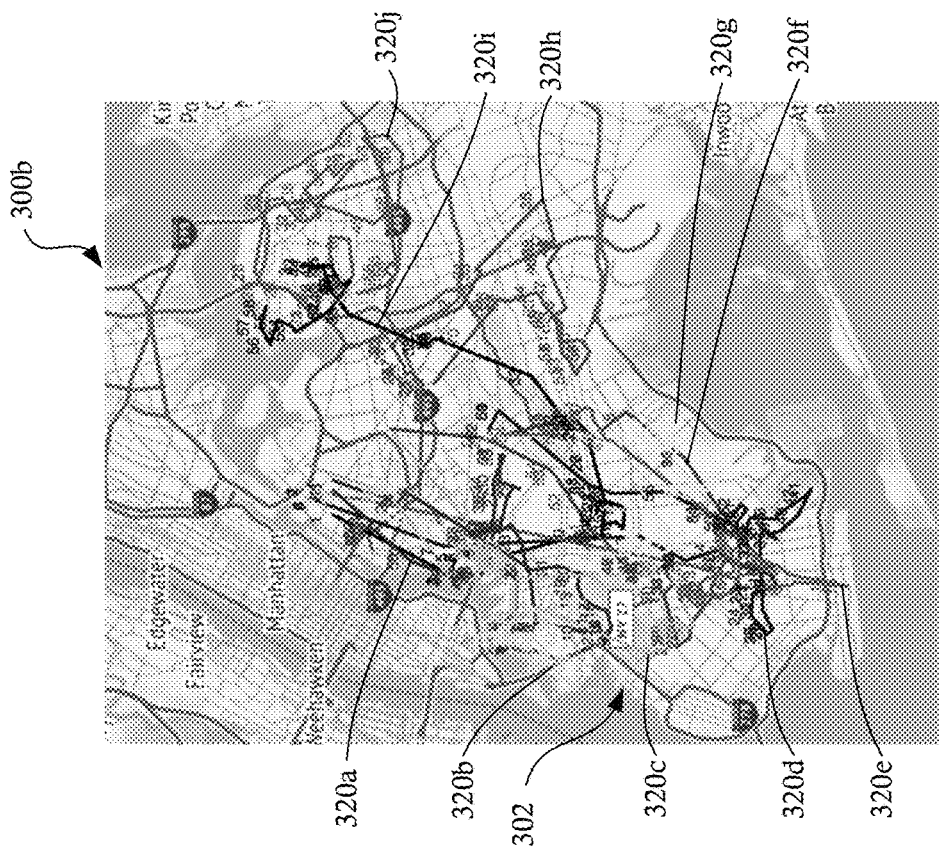
FIG. 6A illustrates a route solution generated without geographic clustering.
Figure 6B:
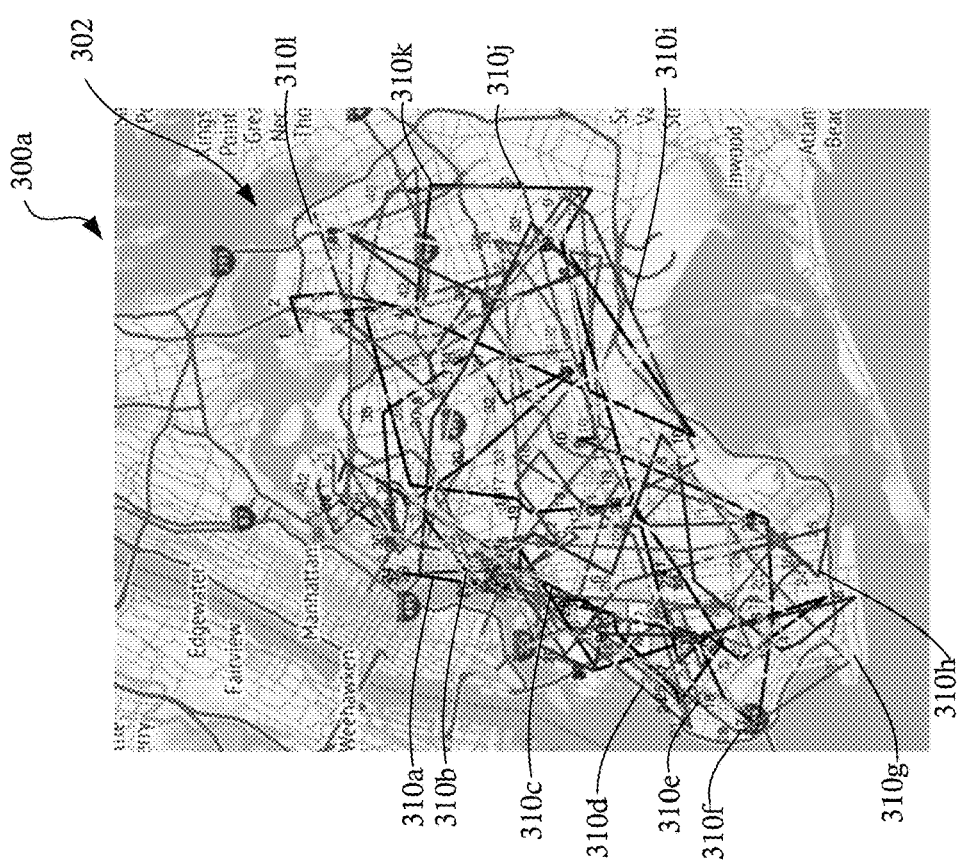
FIG. 6B illustrates a route solution generated with geographic clustering, in accordance with some embodiments.

In some embodiments, the method 100 of generating route assignments using geographic clustering provides higher optimization and shorter determination periods as compared to routes generated without geographic clustering. For example, FIGS. 6A and 6B illustrate route solutions 300a, 300b generated by a resource optimization and vehicle routing (ROVR) algorithm using the same order data, in accordance with some embodiments. The route solution 300a (FIG. 6A) was generated without geographic clustering and the a route solution 300b (FIG. 6B) was generated with geographic clustering. The route solution 300a includes a plurality of non-optimized routes 310a-310l (collectively "non-optimized routes 310") and the route solution 300b includes a plurality of optimized routes 320a-320j (collectively "optimized routes 320"). As shown in FIG. 6A, each of the non-optimized routes 310 passes through large portions of a geographic area 302 such that each route requires a large number of miles to be driven, time spent performing deliveries, and expenditure of gas. In contrast, the route solution 300b generated with geographic clustering (as illustrated in FIG. 6B) includes geographically compact optimized routes 320 that traverse only a set portion of the geographic area 302. Each of the optimized routes 320 provide a lesser number of total miles to be traveled, less time spent performing deliveries, and a lesser expenditure of gas and other resources (e.g., fewer trucks required for shorter period).

In one non-limiting example embodiment, a plurality of orders including 3,169 orders is received in a predetermined time period. Using a traditional route solution system running in a fifteen minute window, the 3,169 orders are assigned such that 70 employee shifts (e.g., 70 driver shifts) are required for delivery with 3,320 miles being traveled during the 70 shifts. In contrast, using a geographic-clustering route solution method, such as method 100 discussed above, running in a fifteen minute window, the 3,169 orders are assigned such that 61 employee shifts are required for delivery with 2,496 miles being traveled during the 61 shifts. The geographically-clustered solutions provide for a reduction in shifts (61 vs 70) and miles traveled (2,496 vs 3,320), resulting in cost and time savings.

Although the subject matter has been described in terms of exemplary embodiments, it is not limited thereto. Rather, the appended claims should be construed broadly, to include other variants and embodiments, which may be made by those skilled in the art.

What is claimed is:

1. A system for generating a routing solution, comprising:
a non-transitory computer readable medium having instructions stored thereon;
a transceiver;
a processor configured to read the instructions to:
receive, via the transceiver, a plurality of orders from a user system, wherein each order in the plurality of orders comprises delivery location data;
generating a trained clustering model configured to cluster the plurality of orders into a plurality of clusters based on the delivery location data of each order, wherein the trained clustering model is generated by:
receiving the delivery location data for each order in the plurality of orders;
generating a partition of clusters by assigning each order in the plurality of orders as an individual cluster based on the delivery location data;
applying a clustering framework to calculate a distance matrix including a distance between each cluster and every other cluster in the partition of clusters, wherein a distance function of the clustering framework includes weighted coefficients;
combining a first cluster and a second cluster having a least distance in the distance matrix;
updating the weighted coefficients of the clustering framework based on a similarity matrix;
updating a predetermined threshold and a predetermined maximum distance metric of the clustering framework based on the similarity matrix; and
automatically iteratively repeating the calculating combining, and updating steps until the partition of clusters is combined into a predetermined number of clusters each having at least one cluster parameter below a predetermined threshold and a predetermined maximum distance metric, wherein the predetermined number of clusters is varied during two or more of the calculating, combining, and updating steps;
generate a linked list data structure comprising a routing solution for each of the plurality of clusters, each linked list data structure comprising a set of parameters including: a total distance to traverse, a plurality of edges to traverse and, for each edge of the plurality of edges, a number of times the corresponding edge is traversed, wherein the linked list data structure for each of the plurality of clusters is generated in parallel using a different set of route parameters for at least two clusters in the plurality of clusters;
iteratively modify at least one linked list data structure to optimize a corresponding set of parameters, wherein the corresponding set of parameters is optimized based on: minimizing the total distance to traverse in the routing solution with a first weight and minimizing the number of times each edge of the plurality of edges is traversed in the routing solution with a second weight; and
transmit each linked list data structure to at least one vehicle system.

2. The system of claim 1, wherein the processor is configured to segment the plurality of orders into predetermined geographic zones prior to clustering.

3. The system of claim 1, wherein the plurality of clusters, the linked list data structure for each of the plurality of clusters, and optimization of the at least one set of parameters are generated by the processor in a predetermined time window.

4. The system of claim 1, wherein the plurality of clusters are generated by truncating a dendrogram.

5. The system of claim 1, wherein the plurality of clusters are generated using a predetermined cluster diameter and an equivalent cluster diameter evaluation.

6. The system of claim 1, wherein the linked list data structure is generated using a route delivery radius control parameter.

7. A non-transitory computer readable medium having instructions stored thereon, wherein the instructions, when executed by a processor cause a device to perform operations comprising:
receiving, via a transceiver, a plurality of orders from a user system, wherein each order in the plurality of orders comprises a geographic location;
generating a trained clustering model configured to cluster the plurality of orders into a plurality of clusters based on the geographic location of each order, wherein the trained clustering model is generated by:
receiving the geographic location for each order in the plurality of orders;
generating a partition of clusters by assigning each order in the plurality of orders as an individual cluster based on the geographic location;
applying a clustering framework to calculate a distance matrix including a distance between each cluster and every other cluster in the partition of clusters, wherein a distance function of the clustering framework includes weighted coefficients;
combining a first cluster and a second cluster having a least distance in the distance matrix;
updating the weighted coefficients of the clustering framework based on a similarity matrix;
updating a predetermined threshold and a predetermined maximum distance metric of the clustering framework based on the similarity matrix; and
automatically iteratively repeating the calculating combining, and updating steps until the partition of clusters is combined into a predetermined number of clusters each having at least one cluster parameter below a predetermined threshold and a predetermined maximum distance metric, wherein the predetermined number of clusters is varied during two or more of the calculating, combining, and updating steps;
generating a linked list data structure comprising a routing solution for each of the plurality of clusters, each linked list data structure comprising a set of parameters including: a total distance to traverse, a plurality of edges to traverse and, for each edge of the plurality of edges, a number of times the corresponding edge is traversed, wherein the linked list data structure for each of the plurality of clusters is generated in parallel using a different set of route parameters for at least two clusters in the plurality of clusters;
iteratively modifying at least one linked list data structure to optimize a corresponding set of parameters, wherein the corresponding set of parameters is optimized based on: minimizing the total distance to traverse in the routing solution with a first weight and minimizing the number of times each edge of the plurality of edges is traversed in the routing solution with a second weight; and
transmitting each linked list data structure to at least one vehicle system.

8. The non-transitory computer readable medium of claim 7, wherein the instructions cause the processor to segment the plurality of orders into predetermined geographic zones prior to clustering.

9. The non-transitory computer readable medium of claim 7, wherein the plurality of clusters, the linked list data structure for each of the plurality of clusters, and optimization of the at least one set of parameters are generated in a predetermined time window.

10. The non-transitory computer readable medium of claim 7, wherein the plurality of clusters are generated by truncating a dendrogram.

11. The non-transitory computer readable medium of claim 7, wherein the plurality of clusters are generated using a predetermined cluster diameter and an equivalent cluster diameter evaluation.

12. The non-transitory computer readable medium of claim 7, wherein the linked list data structure is generated using a route delivery radius control parameter.

13. A method, comprising:
receiving a plurality of orders from a user system, wherein each order in the plurality of orders comprises a geographic location;
clustering the plurality of orders into a plurality of clusters based on the geographic location of each order by:
generating a trained clustering model including an optimal number of clusters for the plurality of orders, wherein the trained clustering model is generated by:
receiving the geographic location for each order in the plurality of orders;
generating a partition of clusters by assigning each order in the plurality of orders as an individual cluster;
calculating a distance matrix including a distance between each cluster and every other cluster in the partition of clusters;
applying a clustering framework to calculate a distance matrix including a distance between each cluster and every other cluster in the partition of clusters, wherein a distance function of the clustering framework includes weighted coefficients;
combining a first cluster and a second cluster having a least distance in the distance matrix;
updating the weighted coefficients of the clustering framework based on a similarity matrix;
updating a predetermined threshold and a predetermined maximum distance metric of the clustering framework based on the similarity matrix; and
automatically iteratively repeating the calculating combining, and updating steps until the partition of clusters is combined into a predetermined number of clusters each having at least one cluster parameter below a predetermined threshold and a predetermined maximum distance metric, wherein the predetermined number of clusters is varied during two or more of the calculating, combining, and updating steps;
generating a linked list data structure comprising a routing solution for each of the plurality of clusters, each linked list data structure comprising a set of parameters including: a total distance to traverse, a plurality of edges to traverse and, for each edge of the plurality of edges, a number of times the corresponding edge is traversed, wherein the linked list data structure for each of the plurality of clusters is generated in parallel using a different set of route parameters for at least two clusters in the plurality of clusters;
iteratively modifying at least one linked list data structure to optimize a corresponding set of parameters, wherein the corresponding set of parameters is optimized based on: minimizing the total distance to traverse in the routing solution with a first weight and minimizing the number of times each edge of the plurality of edges is traversed in the routing solution with a second weight; and transmitting each linked list data structure to at least one vehicle system.

14. The method of claim 13, wherein the plurality of clusters, the linked list data structure for each of the plurality of clusters, and optimization of the at least one set of parameters are generated in a predetermined time window.

\* \* \* \* \*